(12) United States Patent
Takata

(10) Patent No.: US 10,583,627 B2
(45) Date of Patent: Mar. 10, 2020

(54) SOUND-ABSORBING MATERIAL AND WIRE HARNESS PROVIDED WITH SOUND-ABSORBING MATERIAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yutaka Takata, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 210 days.

(21) Appl. No.: 15/547,149

(22) PCT Filed: Jan. 9, 2016

(86) PCT No.: PCT/JP2016/050588
§ 371 (c)(1),
(2) Date: Jul. 28, 2017

(87) PCT Pub. No.: WO2016/121468
PCT Pub. Date: Aug. 4, 2016

(65) Prior Publication Data
US 2018/0022064 A1    Jan. 25, 2018

(30) Foreign Application Priority Data
Jan. 30, 2015  (JP) ................................. 2015-016941

(51) Int. Cl.
*B32B 5/26* (2006.01)
*B60R 13/08* (2006.01)
(Continued)

(52) U.S. Cl.
CPC ................ *B32B 5/26* (2013.01); *B60R 13/08* (2013.01); *B60R 16/0207* (2013.01);
(Continued)

(58) Field of Classification Search
CPC ....... B32B 5/26; B60R 13/08; B60R 16/0207; B60R 16/0215; G10K 11/162; G10K 11/1685; H02G 3/04; H02G 3/0487
See application file for complete search history.

(56) References Cited

U.S. PATENT DOCUMENTS

| | | | |
|---|---|---|---|
| 8,496,088 B2* | 7/2013 | Kitchen .................... | B32B 5/26 181/290 |
| 2004/0231915 A1* | 11/2004 | Thompson, Jr. .......... | B32B 5/02 181/290 |

(Continued)

FOREIGN PATENT DOCUMENTS

| | | |
|---|---|---|
| JP | 2005263118 A | 9/2005 |
| JP | 2006160197 A | 6/2006 |

(Continued)

OTHER PUBLICATIONS

International Search Report for Application No. PCT/JP2016/050588 dated Mar. 8, 2016, 6 pages.
(Continued)

*Primary Examiner* — Jeremy A Luks
(74) *Attorney, Agent, or Firm* — Reising Ethington, P.C.

(57) ABSTRACT

A sound-absorbing material with a high tensile strength and a wire harness provided with the sound-absorbing material in which the sound-absorbing material and the wire harness are integrated with each other. The sound-absorbing material may include two first nonwoven fabrics that are stacked in their thickness direction and a second nonwoven fabric that is disposed between the two first nonwoven fabrics, in which a portion of end surfaces in a thickness direction of the (Continued)

second nonwoven fabric has fixing portions in which fibers are bonded to each other by an adhesive or a fusion means, and a wire harness provided with the sound-absorbing material in which a wire harness and the sound-absorbing material are integrated other by covering at least a portion of the wire harness extending in an axial direction, with the sound-absorbing material.

6 Claims, 6 Drawing Sheets

(51) Int. Cl.
    *G10K 11/162*     (2006.01)
    *H02G 3/04*     (2006.01)
    *G10K 11/168*     (2006.01)
    *B60R 16/02*     (2006.01)
    *H01B 7/42*     (2006.01)

(52) U.S. Cl.
    CPC .......... *G10K 11/162* (2013.01); *G10K 11/168* (2013.01); *H01B 7/42* (2013.01); *H02G 3/04* (2013.01); *H02G 3/0487* (2013.01); *B60R 16/0215* (2013.01)

(56) References Cited

U.S. PATENT DOCUMENTS

| | | | |
|---|---|---|---|
| 2006/0021823 A1* | 2/2006 | Kohara | ............... B32B 5/24 181/290 |
| 2012/0037447 A1* | 2/2012 | Duval | ............... B32B 5/22 181/290 |
| 2015/0203058 A1* | 7/2015 | Osada | ............... B60R 13/0243 307/9.1 |
| 2016/0042730 A1* | 2/2016 | Takata | ............... B32B 5/022 181/290 |

FOREIGN PATENT DOCUMENTS

| | | | |
|---|---|---|---|
| JP | 2008068799 A | | 3/2008 |
| JP | 2010128005 A | | 6/2010 |
| JP | 2011084855 A | * | 4/2011 |

OTHER PUBLICATIONS

International Preliminary Report on Patentability for Application No. PCT/JP2016/050588, 5 pages.

* cited by examiner

31

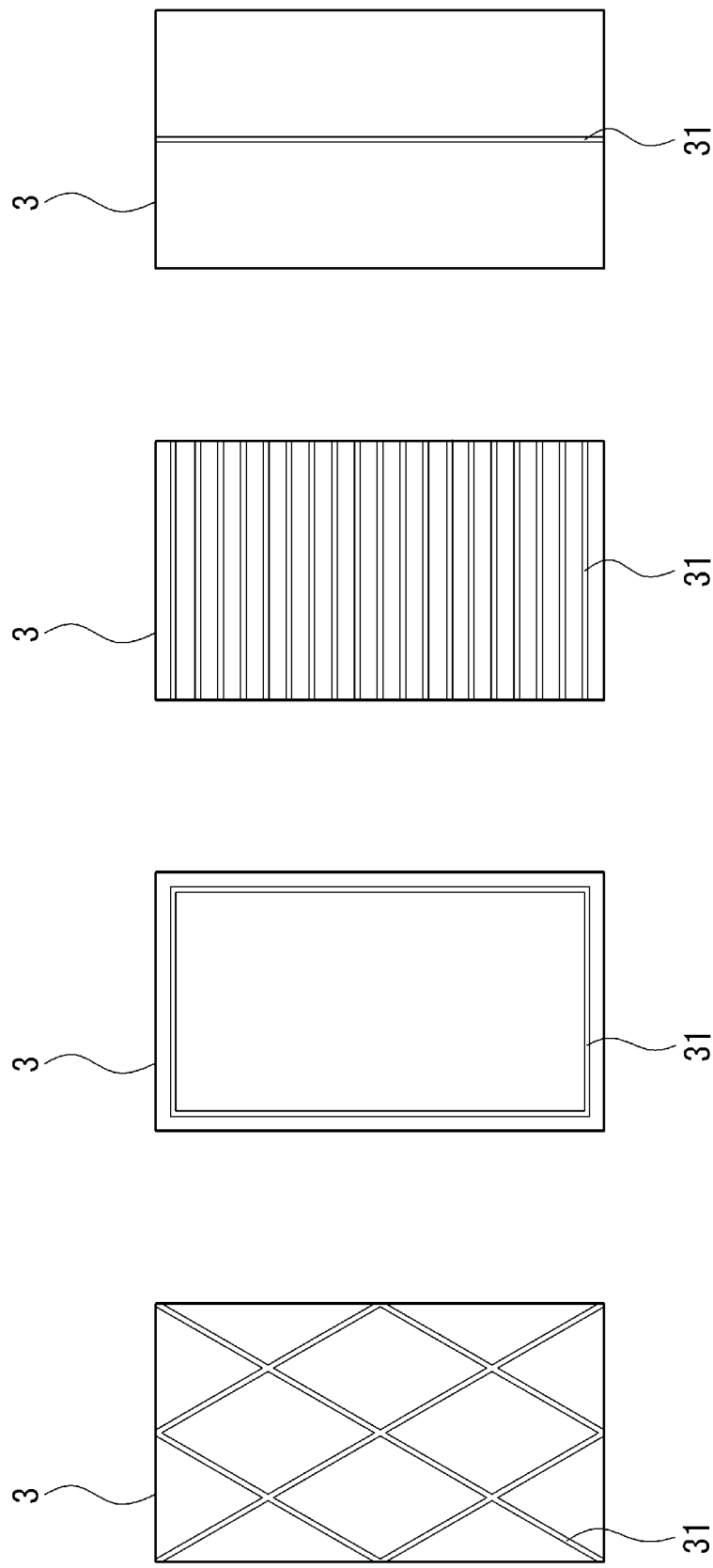

SOUND-ABSORBING MATERIAL AND WIRE HARNESS PROVIDED WITH SOUND-ABSORBING MATERIAL

CROSS REFERENCE TO RELATED APPLICATIONS

This application claims the priority of Japanese patent application JP2015-016941 filed on Jan. 30, 2015, the entire contents of which are incorporated herein.

TECHNICAL FIELD

The present invention relates to a sound-absorbing material using nonwoven fabric, and a wire harness provided with the sound-absorbing material in which the sound-absorbing material and a wire harness are integrated with each other.

BACKGROUND ART

Conventionally, in order to increase silence in the interior of an automobile, a sound insulation material or a sound-absorbing material that is made of glass wool, rock wool, porous ceramic, urethane foam, waste cotton, or the like is provided in the vicinity of apparatuses that generate noise in a vehicle. However, from the viewpoint of workability of the sound insulation material or the sound-absorbing material, its influence on the human body, its recyclability, environmental impact, a decrease in its weight, and the like, today, nonwoven fabrics are widely used in these sound insulation materials and sound-absorbing materials.

Also, in recent years, performance and functions of automobiles, electric appliances, and the like have been improved rapidly. In order to control various electronic apparatuses provided in these automobiles and electric appliances, multiple electric wires need to be routed inside the automobiles. Ordinarily, these electric wires are used in the form of a wire harness. Wire harnesses are obtained by assembling a plurality of electric wires in advance into a form required for wiring, and formed by providing the necessary branches and attaching connectors to their terminal ends, for example, and then winding tape-shaped, tube-shaped, or sheet-shaped protection materials around the outer circumference of the electric wire bundle.

A wire harness routed inside a vehicle comes into contact with a vehicle body or other members inside the vehicle due to vibration while the vehicle is moving, and makes noise in some cases. Thus, in some cases, the outer circumference of the wire harness is provided with a buffer material for suppressing noise caused by contact with any other member. An example of a prior art device can be found in JP 2008-068799A.

SUMMARY

There is an increasing need for silence in the interior of an automobile along with the spread of EV (electric vehicle) technology in the automobile market in recent years. In order to improve silence in the interior of the automobile, it is necessary to take measures against noise ranging from low frequencies to high frequencies, such as road noise or wind noise, which also has been an issue with gasoline cars, as well as noise produced from its motor in high frequency ranges of at least 5000 Hz. Various methods have been developed as part of such measures, such as vehicle design giving consideration to a decrease in noise, sound-absorbing materials for absorbing noise over a wide range from low frequencies to high frequencies, and resin members having a sound blocking capability that is equivalent to that of metal components.

Also, in order to increase the fuel efficiency of a vehicle, the reduction of the weight of vehicle parts is promoted, and for this, sound-absorbing materials for absorbing noise that are made of nonwoven fabric have been used widely. When a sound-absorbing material constituted by nonwoven fabric is disposed inside the vehicle, the sound-absorbing material is attached while being pulled or bent in accordance with the shape of the location at which the sound-absorbing material is installed and the position in the vehicle. Although the sound-absorbing material constituted by nonwoven fabric obtains its sound-absorption properties due to a soft fiber structure that has many voids and with which a certain airflow rate is ensured, the nonwoven fabric is soft, and thus the sound-absorbing material has the weakness that it easily breaks by being strongly pulled during attachment. On the other hand, if the constituent fibers are strongly entangled in order to prevent the nonwoven fabric from rupturing, the airflow rate and flexibility of the nonwoven fabric are lost, and there is a risk that the desired sound-absorption performance will not be obtained. In this manner, the sound-absorbing material constituted by nonwoven fabric is problematic in that it is difficult to achieve increases in both its sound-absorption performance and tensile strength.

The present design has been achieved in light of the above-described issues, and provides a sound-absorbing material with a high tensile strength while maintaining its sound-absorption performance, and a wire harness provided with the sound-absorbing material in which the sound-absorbing material and the wire harness are integrated with each other.

In order to resolve the above-described issues, a sound-absorbing material according to the present design includes two first nonwoven fabrics that are stacked in their thickness direction, and a second nonwoven fabric that is disposed between the two first nonwoven fabrics, in which a portion of end surfaces in a thickness direction of the second nonwoven fabric has fixing portions in which fibers are bonded to each other by an adhesive or a fusion means.

In the sound-absorbing material, the fixing portions may be provided over the entirety of at least one of the end surfaces at predetermined intervals.

A configuration may be adopted in which in the sound-absorbing material, the second nonwoven fabric is a thin film-shaped nonwoven fabric, and the fixing portions are formed by thermal fusion bonding using an embossing roll.

It is preferable that in the sound-absorbing material, a stacked nonwoven fabric obtained by stacking the first nonwoven fabrics and the second nonwoven fabric has a tensile strength in a direction orthogonal to the thickness direction of at least 10 N/25 mm.

It is preferable that in the sound-absorbing material, the second nonwoven fabric is made from long-staple fibers.

It is preferable that in the sound-absorbing material, an airflow rate of the stacked nonwoven fabric obtained by stacking the first nonwoven fabrics and the second nonwoven fabric is in a range of 5 to 50 $cm^3/cm^2 \cdot s$.

It is preferable that in the sound-absorbing material, the second nonwoven fabric has a smaller thickness than the first nonwoven fabrics.

In order to resolve the above-described issues, in a wire harness provided with the sound-absorbing material according to the present design, the wire harness and the sound-absorbing material are integrated with each other by covering at least a portion of the wire harness extending in an axial direction, with the sound-absorbing material.

According to the sound-absorbing material and the wire harness provided with the sound-absorbing material according to the present design, it is possible to provide a sound-absorbing material with a high tensile strength while maintaining its sound-absorption performance, and a wire harness provided with the sound-absorbing material in which the sound-absorbing material and the wire harness are integrated with each other.

BRIEF DESCRIPTION OF DRAWINGS

FIG. 3 is a diagram showing conceivable shape patterns of the fixing portions.

DESCRIPTION OF EMBODIMENTS

Figure 1A:
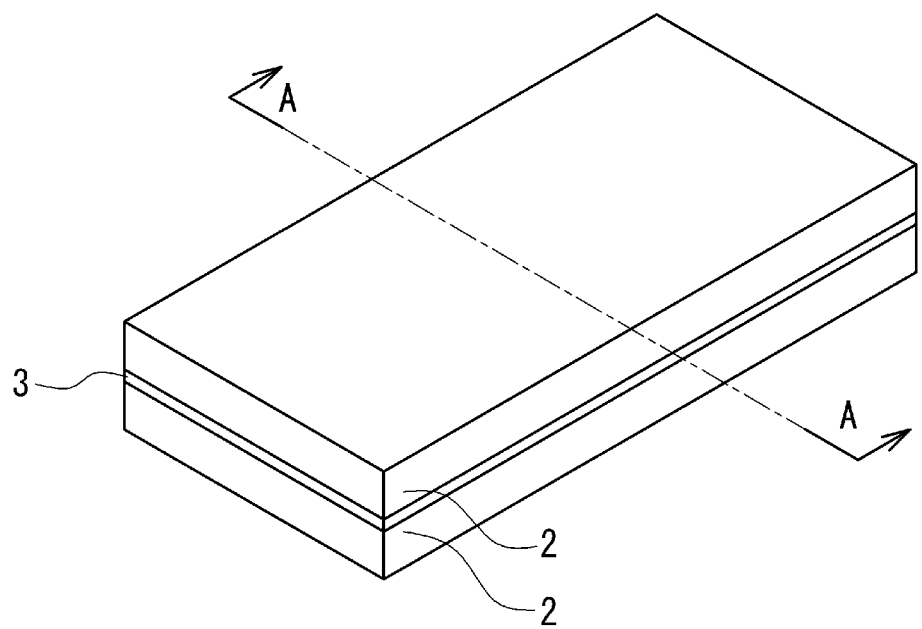
FIG. 1A shows a perspective view of an external appearance of a sound-absorbing material and FIG. 1B shows its cross-sectional view taken along line A-A.
Figure 1B:
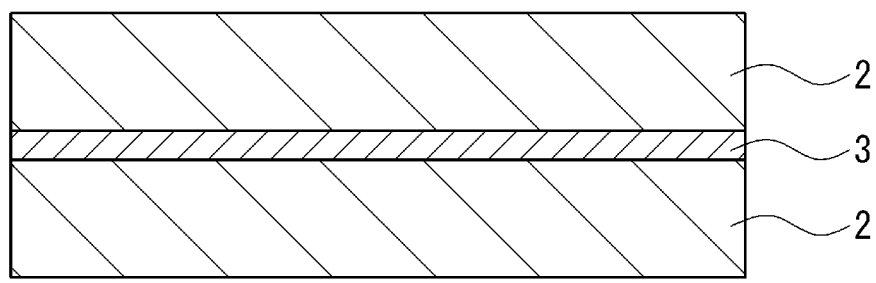

Hereinafter, an embodiment will be described in detail with reference to the drawings. FIG. 1($a$) shows a perspective view of an external appearance showing one example of a sound-absorbing material according to the present invention, and FIG. 1($b$) shows a cross-sectional view taken along line A-A of a sound-absorbing material 1 in FIG. 1($a$). The sound-absorbing material and the wire harness provided with the sound-absorbing material can be suitably used as a sound-absorbing material for a vehicle such as an automobile, and noise entering the interior of a car from an engine room of an automobile or its outside is blocked by disposing the sound-absorbing material and the wire harness provided with the sound-absorbing material in a dashboard or an inner space of a door of the automobile.

The sound-absorbing material 1 of the present embodiment is a stacked nonwoven fabric constituted by two first nonwoven fabrics 2 stacked in their thickness direction and a second nonwoven fabric 3 disposed therebetween. The first nonwoven fabrics 2 and the second nonwoven fabric 3 are integrated by gluing their opposing surfaces together with a thermally fusible sheet. The method for joining the first nonwoven fabrics 2 and the second nonwoven fabric 3 is not limited to thermally fusible sheets, and needle punching, stapling, or the like may be used as well.

Also, the sound-absorbing material 1 is adjusted so as to have an airflow rate of 5 to 50 cm$^3$/cm$^2$·s. Note that in the present application, "airflow rate" refers to a "value measured by the "Frazier Air Permeability Test" in 8. 26. 1A in JIS L 1096 "Testing methods for woven and knitted fabrics"". The Frazier Air Permeability Test can be conducted by measuring airflow rates using a commercially available Frazier tester.

Figure 2:
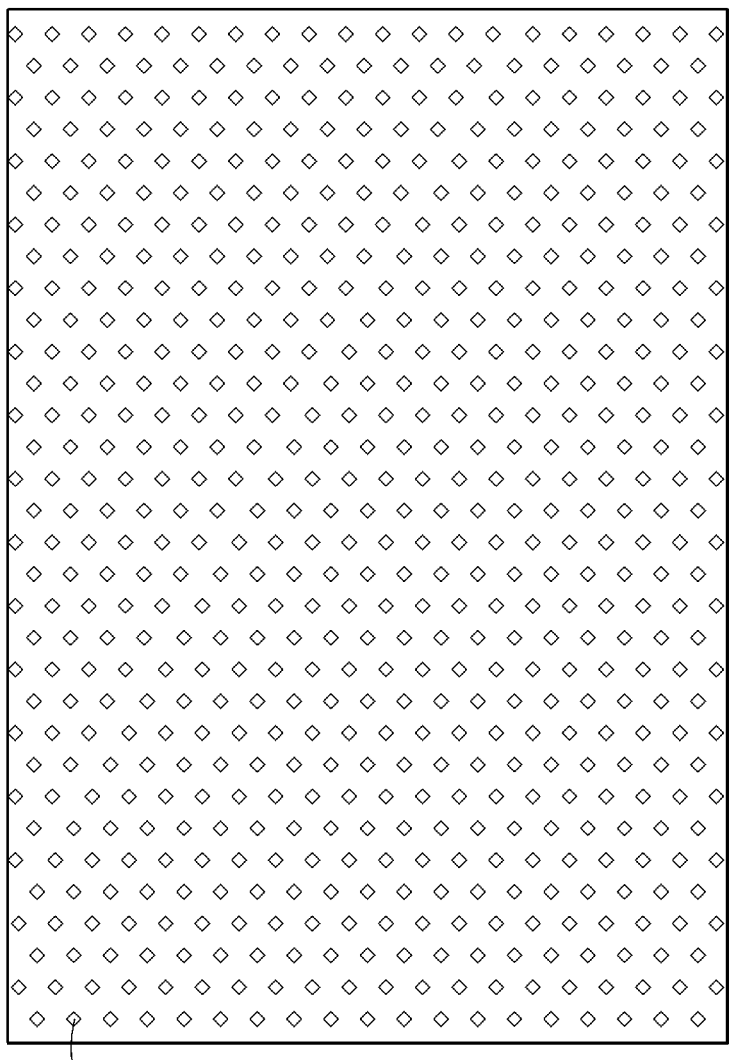
FIG. 2 is a plan view of a second nonwoven fabric showing the shape of fixing portions in this embodiment.

FIG. 2 is a plan view of the second nonwoven fabric 3 before stacking. The second nonwoven fabric 3 is a thin film-shaped nonwoven fabric that is made from long-staple fibers and has a thickness of 0.5 mm, and rhombic fixing portions 31 are provided over its entire upper surface (the surface on the upper side in FIG. 1) at predetermined intervals. The fixing portions 31 in the present embodiment are formed by locally heat sealing (thermal fusion bonding of) fibers using an embossing roll. Note that the fixing portions 31 are not only provided on the upper surface of the second nonwoven fabric 3 but may be also provided on both surfaces in the thickness direction.

The fibers in the fixing portions 31 are strongly bonded by being pressed and heated with the embossing roll, and melted and solidified in a state in which the fibers are in close contact with each other. With such a fiber structure, the fixing portions 31 exhibit a high tensile strength because the entangling of the fibers does not easily loosen even if a tensile stress is applied thereto. Also, because the second nonwoven fabric 3 is made from long-staple fibers, the tensile strength of the fixing portions 31 is improved also in a region other than the fixing portions 31.

Note that the fixing portions 31 in the present embodiment are formed using the embossing roll, and this method is selected because the second nonwoven fabric 3 is a thin film-shaped nonwoven fabric and this method has a small effect on its thickness even if the second nonwoven fabric 3 passes the embossing roll, and the second nonwoven fabric 3 can be processed in a relatively short amount of time using an ordinary embossing apparatus. The method for forming the fixing portions 31 is not limited to thermally fusing with an embossing roll, and an adhesive, ultrasonic welding, or the like may be used as well. These formation methods can be selected as appropriate in accordance with the thickness of the second nonwoven fabric 3, the type and properties of the constituent fibers.

Also, although the rhombic fixing portions 31 are provided over the entire upper surface of the second nonwoven fabric 3 at predetermined intervals in the present embodiment, the shape of the fixing portions 31 is not limited to a dot form as in the present embodiment, and as shown in FIG. 3, various patterns are conceivable.

The fixing portions 31 have a configuration for increasing the tensile strength of the second nonwoven fabric 3, and accordingly, increasing the tensile strength of the sound-absorbing material 1, which is the stacked nonwoven fabric including the second nonwoven fabric 3. Of course, if the entire surface of the second nonwoven fabric 3 would be made to serve as the fixing portions 31, the highest tensile strength could be obtained, but the airflow rate of the second nonwoven fabric 3 would be insufficient, and the sound-absorption performance of the sound-absorbing material 1 would deteriorate.

Also, when the sound-absorbing material 1 is attached inside a vehicle, a tensile stress of about 10 N/25 mm is expected to act on the sound-absorbing material 1. The fixing portions 31 in the present embodiment are formed over approximately 25% of the surface area of the second nonwoven fabric 3, and accordingly, the tensile strength in a direction orthogonal to the thickness direction of the sound-absorbing material 1 is at least 10 N/25 mm.

The preferred shape and arrangement pattern of the fixing portions 31 in the second nonwoven fabric 3, and the preferred ratio of the fixing portions 31 with respect to the surface area depend on the fiber length of constituent fibers of the second nonwoven fabric 3, the type and properties of fibers, and the tensile strength of the first nonwoven fabrics 2. These combinations need be adjusted in such a range that the overall tensile strength of the sound-absorbing material 1 including the second nonwoven fabric 3 is at least 10 N/25 mm and the airflow rate of the sound-absorbing material 1 is 5 to 50 cm$^3$/cm$^2$·s.

It is desirable that the weight per area of the first nonwoven fabric 2 is in a range of 100 to 1000 g/m$^2$, and its thickness is in a range of 1.0 to 50.0 mm. If the weight per area is increased, the sound absorption coefficients in all frequency bands tend to increase, whereas if the weight per area is reduced, the sound absorption coefficients in all frequency bands tend to decrease. Also, if the thickness is increased, the sound-absorption performance in low frequency bands tends to increase, whereas if the thickness is reduced, the sound-absorption properties in high frequency bands tend to increase. The thickness of the first nonwoven fabric 2 can be adjusted as appropriate in accordance with the frequency band that is to be absorbed.

It is desirable that the weight per area of the second nonwoven fabric 3 is in a range of 10 to 400 g/m$^2$, and its thickness is in a range of 0.1 to 4.0 mm. By making the thickness of the second nonwoven fabric 3 smaller than that of the first nonwoven fabric 2, the second nonwoven fabric 3 has better sound-absorption properties in high frequency ranges than the first nonwoven fabric 2, and can absorb noise in wider frequency bands. However, if its weight per area and thickness are less than the above-described ranges, there is a risk that the sound-absorption effects of the second nonwoven fabric 3 as the sound-absorbing material will not be exhibited sufficiently. In the present embodiment, a thin film-shaped nonwoven fabric having a smaller thickness than the first nonwoven fabric 2 is adopted as the second nonwoven fabric 3, and the fixing portions 31 are provided on the second nonwoven fabric 3 with the embossing roll, and thus the tensile strength is increased without impairing the original sound-absorption performance of the sound-absorbing material 1 ranging from low frequencies to high frequencies.

A fiber diameter of the second nonwoven fabric 3 is desirably in a range of 1 to 50 μm, and a fiber diameter of the first nonwoven fabric 2 is desirably in a range of 4 to 100 μm. Although a nonwoven fabric with a narrow fiber diameter has a high sound-absorption performance when used as the nonwoven fabric, if its fiber diameter is too narrow, there is a risk that the nonwoven fabric will be fragile.

Examples of a fiber material that can be used for the first nonwoven fabric 2 and the second nonwoven fabric 3 include polyesters such as polyethylene terephthalate and polybutylene terephthalate, polyolefins, nylon, polyamide, polyvinyl chloride, rayon, acryl, acrylonitrile, cellulose, kenaf, and glass.

Spunbonding, spunlacing, needle punching, melt blowing, and the like can be used as the method for manufacturing the first nonwoven fabric 2 and the second nonwoven fabric 3.

There is no particular limitation to the cross-sectional shape of the first nonwoven fabric 2 and the second nonwoven fabric 3, and core-sheath, cylindrical, hollow, side-by-side fibers and other fibers having modified cross-sectional shapes that are different from those of ordinary fibers may be used.

Figure 4A:
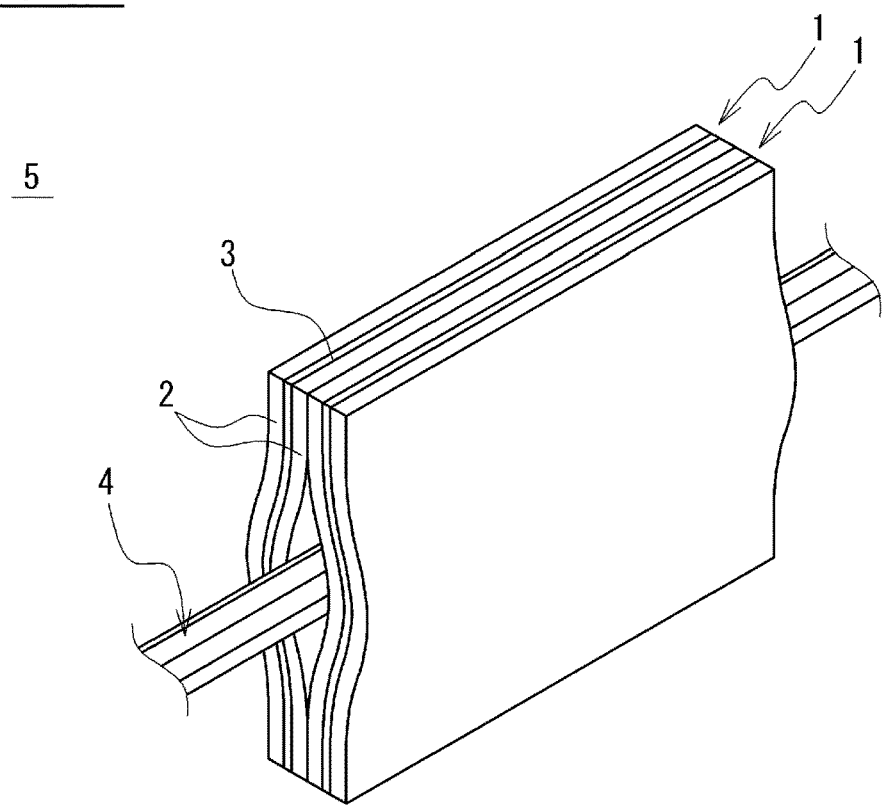
FIGS. 4A and 4B show a perspective view of an external appearance of a wire harness provided with the sound-absorbing material.
Figure 4B:
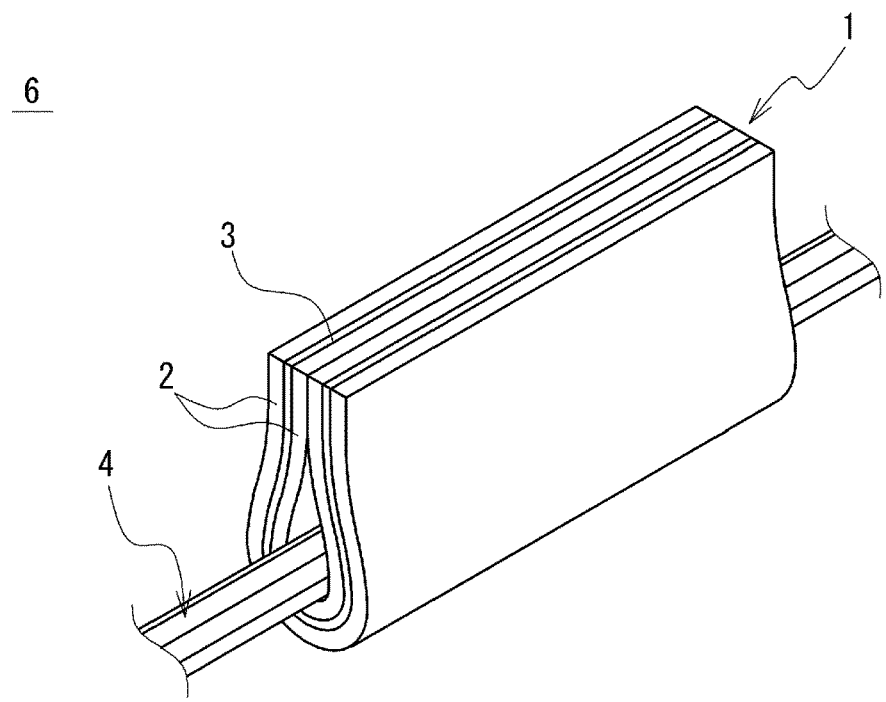

FIG. 4 shows a perspective view of an external appearance of a wire harness provided with the sound-absorbing material. A wire harness provided with a sound-absorbing material 5 in FIG. 4(a) is obtained by integrating a portion of a wire harness 4 extending in the axial direction, with two sound-absorbing materials 1 in a state in which the portion is sandwiched between the two sound-absorbing materials 1, and a wire harness provided with a sound-absorbing material 6 in FIG. 4(b) is obtained by integrating a portion of the wire harness 4 extending in the axial direction, with one sound-absorbing material 1 by wrapping the sound-absorbing material 1 around that portion. The end portions of these sound-absorbing materials 1 are stacked in their thickness direction and the stacked portions are fixed to the wire harness 4 by linking the stacked portions with a stapler, an adhesive, a tag pin, or the like.

Examples of the wire harness 4 include a wire harness obtained by bundling a plurality of electric wires that are obtained by coating a core wire with an insulator and a wire harness constituted by only a single electric wire.

By sandwiching and covering a portion of the wire harness 4, the sound-absorbing material 1 does not only function as the sound-absorbing material but also as a buffer material for the wire harness 4.

WORKING EXAMPLES

Tensile Strength Testing

Hereinafter, a method for tensile strength testing conducted on the sound-absorbing material of the present application and the results will be described.

The specifications of the first nonwoven fabric and the second nonwoven fabric that were used in the tensile strength testing are as follows. For comparison, second nonwoven fabrics having weight per areas of 50 g/m$^2$, 20 g/m$^2$, and 10 g/m$^2$ were prepared, and second nonwoven fabrics having upper surfaces provided with rhombic fixing portions and second nonwoven fabrics having upper surfaces provided with no fixing portions were prepared. Sound-absorbing materials of the working examples and the comparative examples were prepared by sandwiching a second nonwoven fabric between two first nonwoven fabrics and joining the second nonwoven fabric thereto with a thermally fusible sheet, as well as sound-absorbing materials that did not include the second nonwoven fabric and were obtained by joining only two first nonwoven fabrics with a thermally fusible sheet.

First Nonwoven Fabric

Fiber material: PET short-staple fiber (fiber length: approximately 51 mm)

Weight per area: 300 g/m$^2$

Thickness: 10 mm

Second Nonwoven Fabric

Fiber material: PET long-staple fiber

Weight per area: 50 g/m$^2$, 20 g/m$^2$, and 10 g/m$^2$

Thickness: 0.5 mm

The tensile strength was measured in conformity with the testing method of "Tensile strength and elongation" in JIS L1913. The size of the test pieces was 25 mm×100 mm, and 20 mm at both ends in their longitudinal direction were held with chucks. The tension rate was set to 100 mm/min, and the maximum tensile strength was determined. Also, as a test for attaching the test pieces to a vehicle, the test pieces were each fixed in a state in which one side of the test piece was pressed down, the test piece was pulled and the other side was fixed, and the test pieces that broke during this were evaluated as "x" and the test pieces that had no defects were evaluated as "O". The results of the above-described tests are shown in Table 1.

TABLE 1

|  | Work. Ex. 1-1 | Work. Ex. 1-2 | Work. Ex. 1-3 | Comp. Ex. 1-1 | Comp. Ex. 1-2 |
|---|---|---|---|---|---|
| Weight per area of first nonwoven fabric (g/m$^2$) | 300 | 300 | 300 | 300 | 300 |
| Weight per area of second nonwoven fabric (g/m$^2$) | 50 | 20 | 10 | 50 | — |
| Fixing portions | yes | yes | yes | no | — |
| Tensile strength (N/25 mm) | 30 | 11 | 10 | 8 | 3 |
| Attachment test evaluation | O | O | O | × | × |

The above-described test results show that the tensile strength of the sound-absorbing material was increased by providing the second nonwoven fabric with fixing portions, and even if the weight per area of the second nonwoven fabric was reduced to 10 g/m$^2$, a tensile strength of 10 N/25 mm was ensured. Furthermore, they show that the sound-absorbing material having a tensile strength of 10 N/25 mm did not break even if a tensile stress equivalent to the stress applied when the sound-absorbing material is attached to a vehicle was applied.

Sound-Absorption Performance Testing

Hereinafter, a method for sound-absorption performance testing conducted on the sound-absorbing material of the present application and its result will be described.

The specifications of the first nonwoven fabric and the second nonwoven fabric that were used in the sound-absorption performance testing are as follows. Sound-absorbing materials of the working examples and the comparative examples were used that were obtained by stacking two first nonwoven fabrics and two second nonwoven fabrics in the thickness direction (first nonwoven fabric/second nonwoven fabric/first nonwoven fabric/second nonwoven fabric).

First Nonwoven Fabric

Fiber material: PET short-staple fiber (fiber length: approximately 51 mm)

Weight per area: 300 g/m$^2$

Thickness: 10 mm

Second Nonwoven Fabric

Fiber material: PET long-staple fiber

Airflow rate: 5 to 60 cm$^3$/cm$^2$·s

The airflow rates of the second nonwoven fabrics used in the working examples and the comparative examples are as follows. The airflow rates shown below were measured in conformity with the "Frazier Air Permeability Testing" method in 8. 26. 1A in JIS L 1096 "Testing methods for woven and knitted fabrics".

Working Example 2-1

5 cm$^3$/cm$^2$·s

Working Example 2-2

25 cm$^3$/cm$^2$·s

Working Example 2-3

50 cm$^3$/cm$^2$·s

Comparative Example 2-1

2 cm$^3$/cm$^2$·s

Comparative Example 2-2

60 cm$^3$/cm$^2$·s

Sound absorption coefficients of the sound-absorbing materials of the above-described working examples and comparative examples were measured in a reverberation room and their sound-absorption performance was evaluated. A specific testing method for sound absorption coefficients in a reverberation room is as follows. The results of testing sound absorption coefficients in a reverberation room are shown in Table 2 and FIG. 6.

Figure 5:
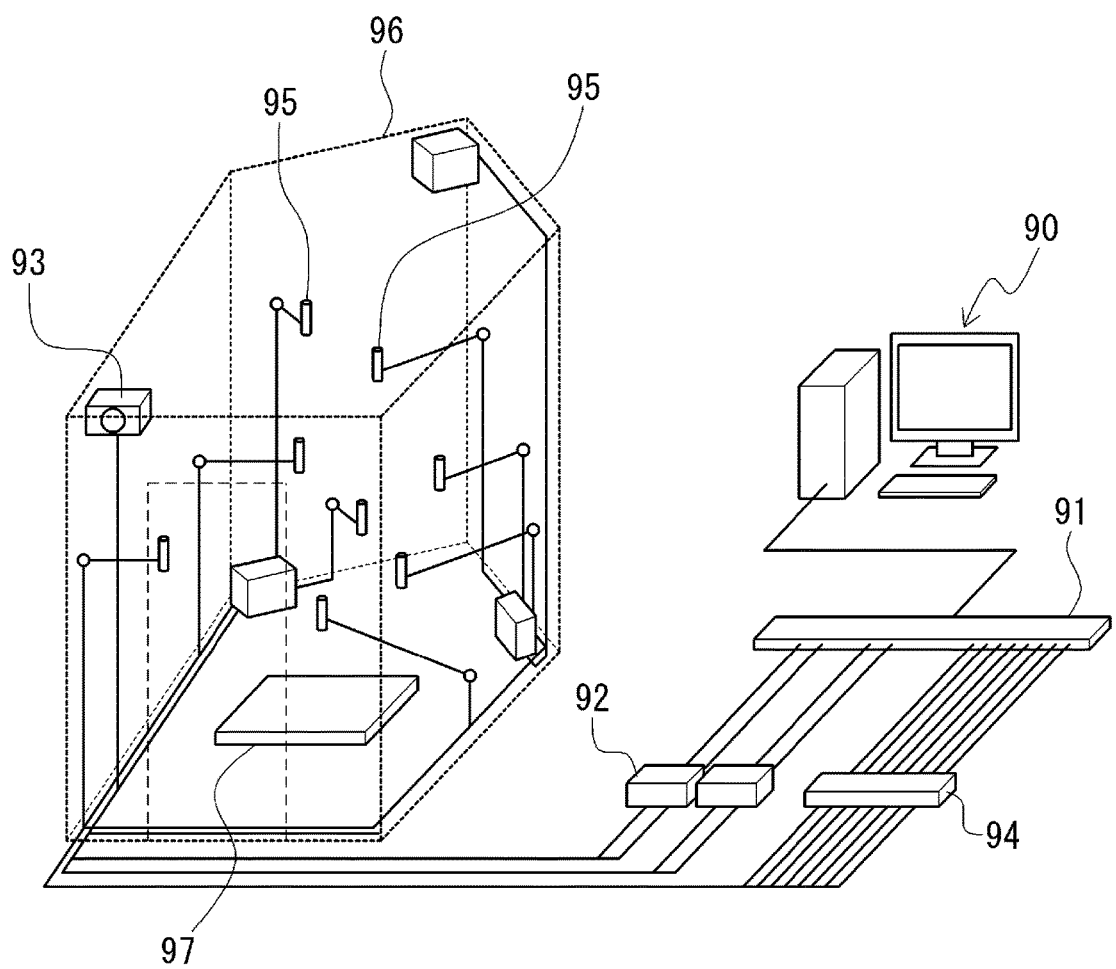
FIG. 5 is a diagram illustrating a measurement apparatus used in testing of sound absorption coefficients in a reverberation room.

Testing for sound absorption coefficients was conducted in conformity with the "Method for measurement of sound absorption coefficients in a reverberation room" in JIS A 1409, and the sound absorption coefficients were obtained with Equation (1) below. As shown in FIG. 5, in the testing, a reverberation room 96 was used in which a speaker 93 that was connected to a personal computer 90 through power amplifiers 92 via an audio interface 91, and microphones 95 connected thereto via a microphone amplifier 94 were disposed at predetermined positions. Measurement was performed by first emitting electrical noise sound from the speaker 93 in a state in which no samples 97 (the sound-absorbing materials of the working examples and comparative examples) were disposed in the reverberation room 96, stopping the sound, and measuring the sound decay with the microphones 95. Next, the time during which the sound decayed over a range of 5 to 35 dB was obtained from the measured decay curve as a reverberation time T1. The measurement was performed in ⅓ octave bands from a center frequency of 400 Hz to 5000 Hz. Next, a sample 97 having an area of 1 m$^2$ was disposed on a floor surface of the reverberation room 96, a reverberation time T2 was obtained similarly to the above, and a sound absorption coefficient (αS) was calculated with Equation (1) below. Note that the value of the sound absorption coefficient means that the greater the sound absorption coefficient is, the better the sample absorbs sound.

$$\alpha S(\text{sound absorption coefficient}) = A/S \quad (1)$$

S: area of sample (m$^2$)

A: equivalent sound absorption area (m$^2$), obtained with Equation (2) below.

$$A = 55.3 \, V/c[1/T2 - 1/T1] \quad (2)$$

V: volume (m$^3$) of reverberation room in state in which no samples were disposed.

c: sound speed in air (m/s)

T1: reverberation time (s) in reverberation room in state in which no samples were disposed T2: reverberation time (s) in reverberation room in state in which a sample was disposed

TABLE 2

|  | Work. Ex. 2-1 | Work. Ex. 2-2 | Work. Ex. 2-3 | Comp. Ex. 2-1 | Comp. Ex. 2-2 |
|---|---|---|---|---|---|
|  | Airflow rate cm$^3$/cm$^2$·s | | | | |
| Frequency (Hz) | 5 | 25 | 50 | 2 | 60 |
|  | sound absorption coefficient in reverberation room | | | | |
| 400 | 0.35 | 0.35 | 0.32 | 0.45 | 0.32 |
| 500 | 0.44 | 0.44 | 0.4 | 0.59 | 0.4 |

TABLE 2-continued

| | Work. Ex. 2-1 | Work. Ex. 2-2 | Work. Ex. 2-3 | Comp. Ex. 2-1 | Comp. Ex. 2-2 |
|---|---|---|---|---|---|
| | \multicolumn{5}{c}{Airflow rate $cm^3/cm^2 \cdot s$} | | | | |
| Frequency (Hz) | 5 | 25 | 50 | 2 | 60 |
| | \multicolumn{5}{c}{sound absorption coefficient in reverberation room} | | | | |
| 630 | 0.59 | 0.59 | 0.55 | 0.78 | 0.55 |
| 800 | 0.88 | 0.77 | 0.75 | 0.95 | 0.65 |
| 1000 | 1.03 | 0.95 | 0.92 | 1.02 | 0.72 |
| 1250 | 1.11 | 1.05 | 0.99 | 1.15 | 0.79 |
| 1600 | 1.15 | 1.11 | 1.05 | 1.13 | 0.88 |
| 2000 | 1.12 | 1.2 | 1.11 | 1.05 | 0.95 |
| 2500 | 1.05 | 1.15 | 1.13 | 1.03 | 0.99 |
| 3150 | 1.03 | 1.05 | 1.18 | 0.98 | 1.02 |
| 4000 | 1.02 | 1.05 | 1.15 | 0.95 | 1.04 |
| 5000 | 1.03 | 1.04 | 1.16 | 0.93 | 1.11 |
| 6300 | 0.98 | 1.02 | 1.09 | 0.82 | 1.11 |
| 8000 | 0.99 | 1.03 | 1.05 | 0.65 | 1.08 |
| 10000 | 0.95 | 1.04 | 1.03 | 0.55 | 1.08 |

Figure 6:
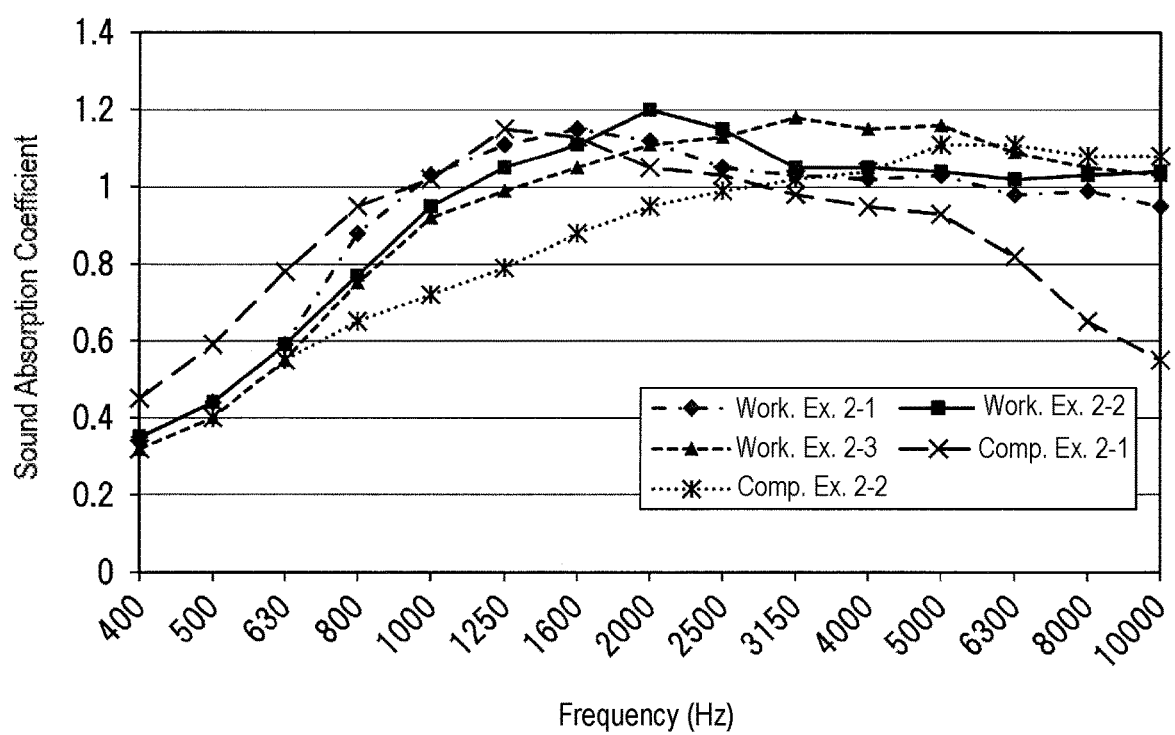
FIG. 6 is a graph showing the results of testing of sound absorption coefficients in a reverberation room.

The test results in Table 2 and FIG. 6 show that when the airflow rate of the sound-absorbing material was 5 to 50 $cm^3/cm^2 \cdot s$ (Working Examples 2-1 to 2-3), the sound-absorbing material exhibited a high sound-absorption performance in a wide range from low frequencies to high frequencies. If the airflow rate was less than 5 $cm^3/cm^2 \cdot s$ (Comparative Example 2-1), the sound-absorption performance decreased in a high frequency range, whereas if the airflow rate exceeded 50 $cm^3/cm^2 \cdot s$ (Comparative Example 2-2), the sound-absorption performance decreased in a low frequency range.

The above-described tests show that both the sound-absorption performance and the tensile strength of the sound-absorbing material were increased by providing the fixing portions on the second nonwoven fabric while adjusting the airflow rate of the sound-absorbing material in a range of 5 to 50 $cm^3/cm^2 \cdot s$.

Although an embodiment, working examples, and comparative examples of the present invention were described in detail above, the present invention is not merely limited to the above-described embodiment or the like, and it will be appreciated that various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sound-absorbing material, comprising:
    two first nonwoven fabrics that are stacked in their thickness direction; and
    a second nonwoven fabric that is disposed between the two first nonwoven fabrics,
    wherein a portion of end surfaces in a thickness direction of the second nonwoven fabric, before the second nonwoven fabric is disposed between the two first nonwoven fabrics, has thermally fusible fixing portions in which fibers are bonded to each other by fusion means,
    an airflow rate of the stacked nonwoven fabric obtained by stacking the first nonwoven fabrics and the second nonwoven fabric is in a range of 5 to 50 $cm^3/cm^2 \cdot s$, and
    a tensile strength in a direction orthogonal to the thickness direction of the stacked nonwoven fabrics obtained by stacking the first nonwoven fabrics and the second nonwoven fabric of at least 10 N/25 mm.

2. The sound-absorbing material according to claim 1, wherein the fixing portions are provided over the entirety of at least one of the end surfaces at predetermined intervals.

3. The sound-absorbing material according to claim 2, wherein the second nonwoven fabric is a thin film-shaped nonwoven fabric, and
    the fixing portions are formed by thermal fusion bonding using an embossing roll.

4. The sound-absorbing material according to claim 1, wherein the second nonwoven fabric is made from long-staple fibers.

5. The sound-absorbing material according to claim 1, wherein the second nonwoven fabric has a smaller thickness than the first nonwoven.

6. A wire harness provided with the sound-absorbing material according to claim 1,
    wherein the wire harness and the sound-absorbing material are integrated with each other by covering at least a portion of the wire harness extending in an axial direction, with the sound-absorbing material.

* * * * *